Sept. 3, 1957 G. J. THOMAS 2,805,076
CHILD'S COMBINATION STROLLER, CAR SEAT, BED AND HIGHCHAIR
Filed June 21, 1954 6 Sheets-Sheet 1

INVENTOR.
GARRETT J. THOMAS
BY
*Harry H. Hitzeman*
ATTORNEY.

Sept. 3, 1957 G. J. THOMAS 2,805,076
CHILD'S COMBINATION STROLLER, CAR SEAT, BED AND HIGHCHAIR
Filed June 21, 1954 6 Sheets-Sheet 2

INVENTOR.
GARRETT J. THOMAS
BY
Harry H. Hitzeman
ATTORNEY.

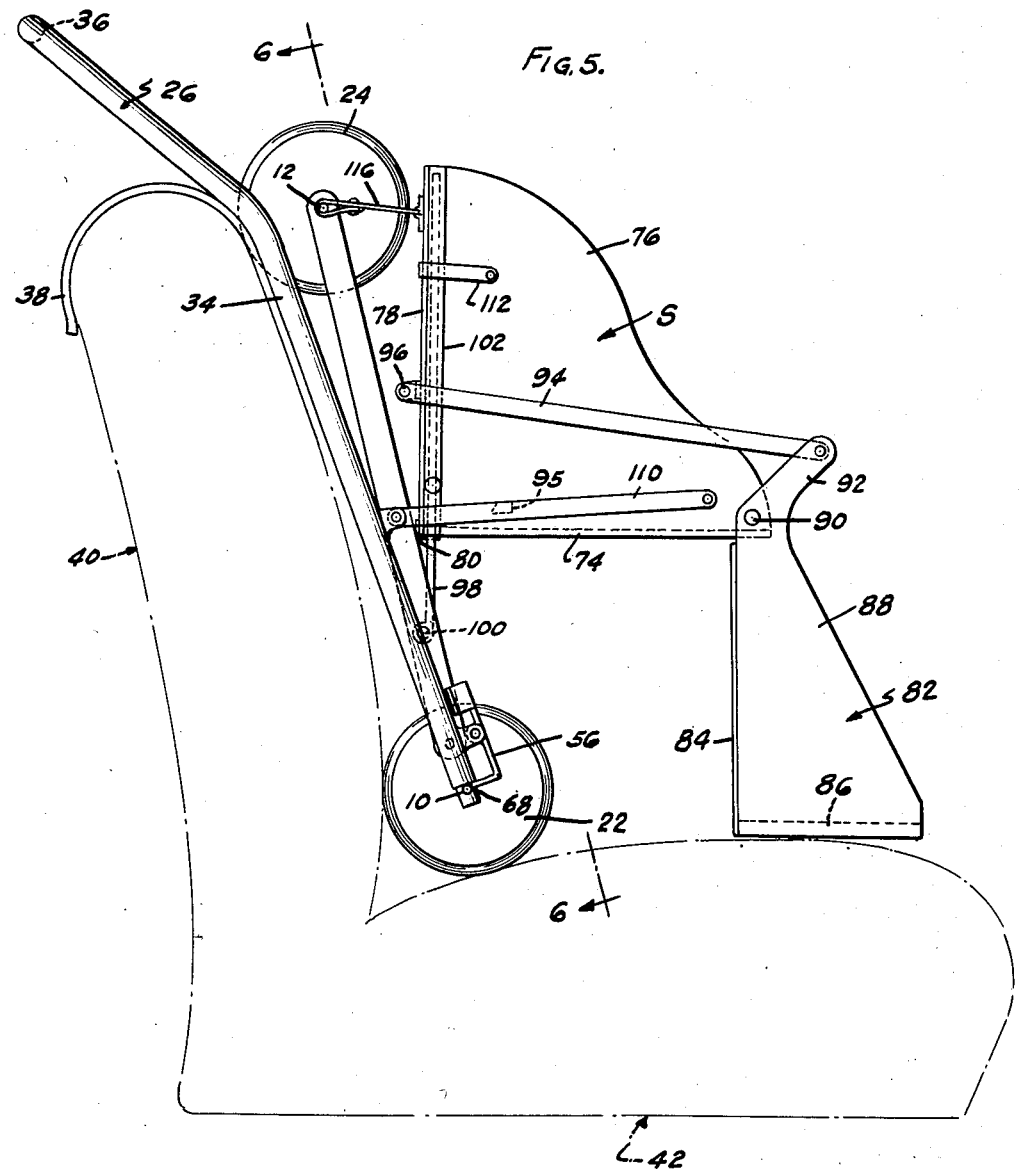

Sept. 3, 1957 G. J. THOMAS 2,805,076
CHILD'S COMBINATION STROLLER, CAR SEAT, BED AND HIGHCHAIR
Filed June 21, 1954 6 Sheets-Sheet 4
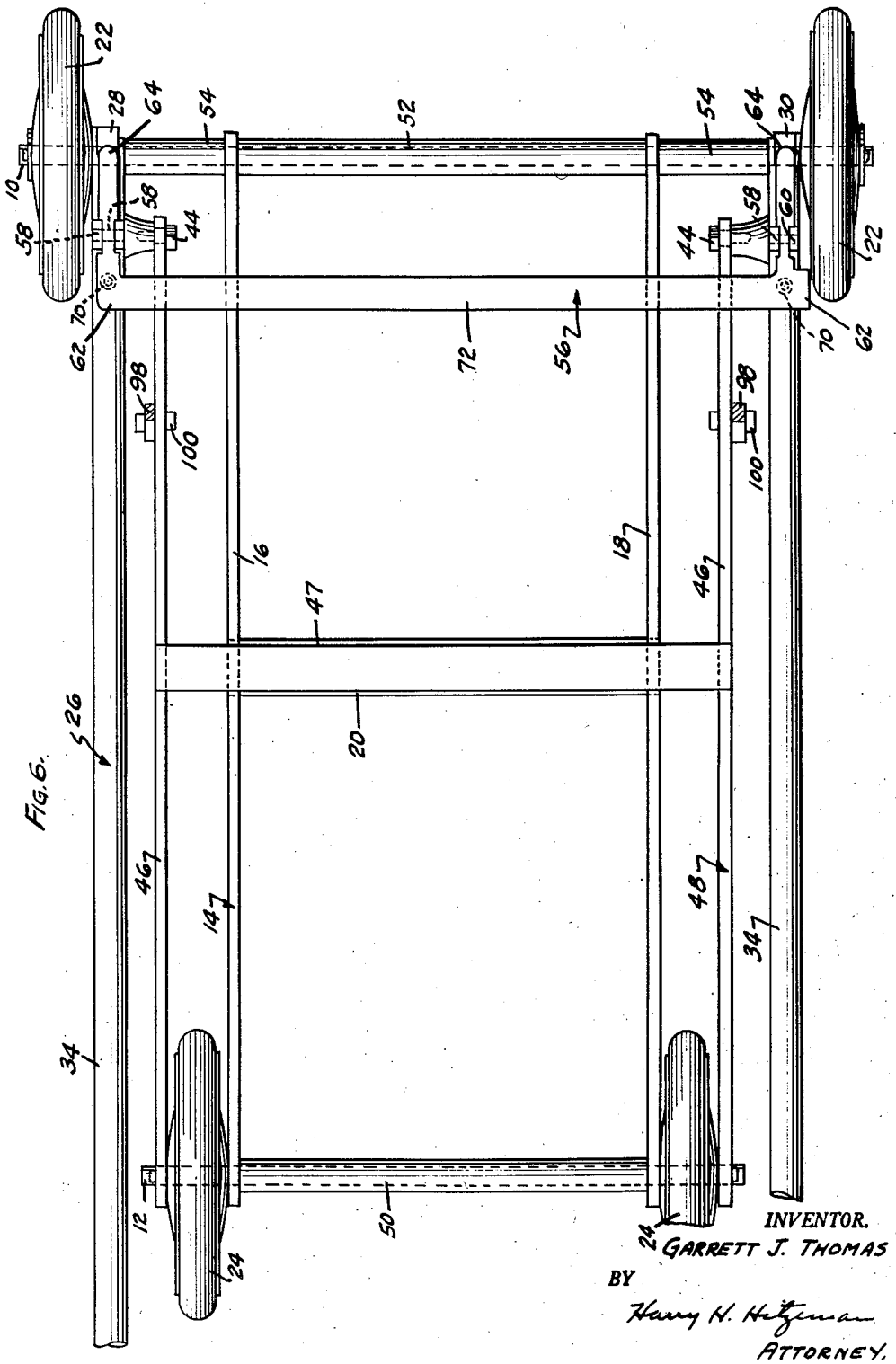
INVENTOR.
GARRETT J. THOMAS
BY
Harry H. Hitzeman
ATTORNEY.

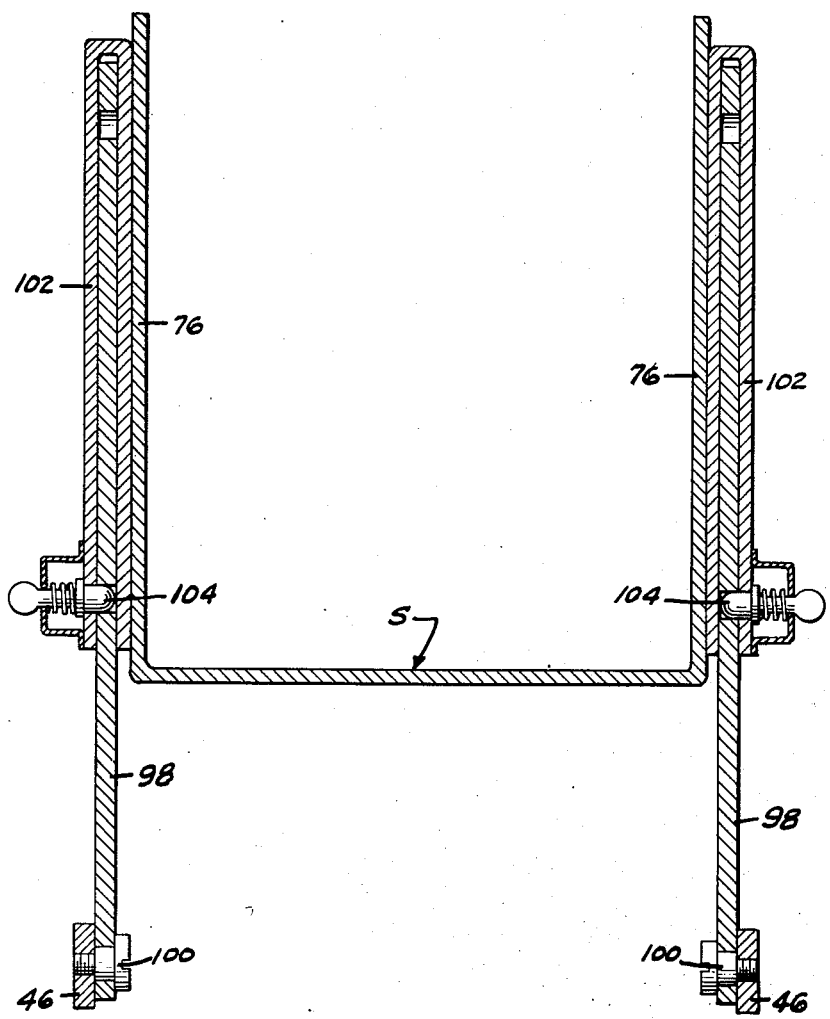

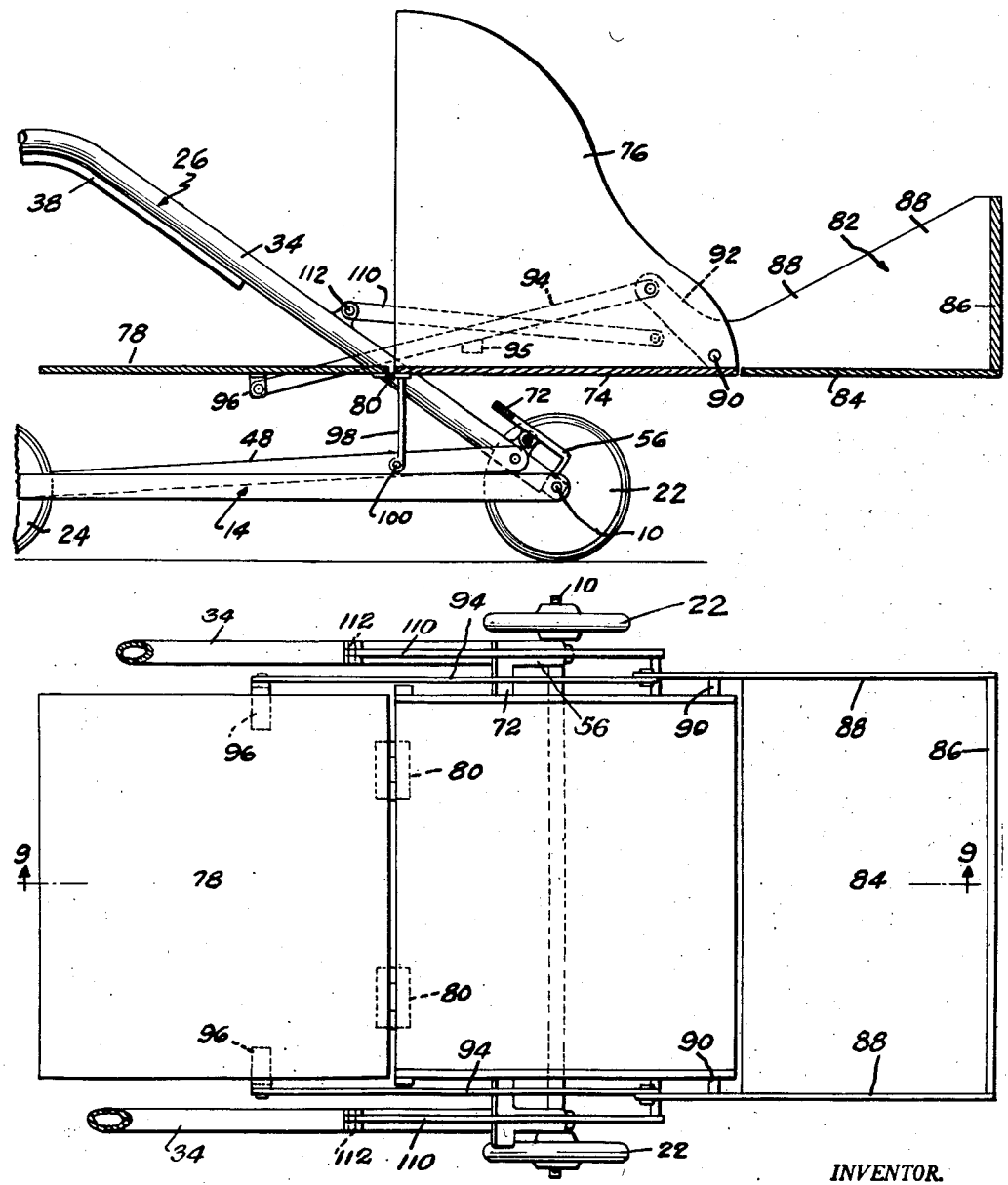

United States Patent Office 2,805,076
Patented Sept. 3, 1957

2,805,076

CHILD'S COMBINATION STROLLER, CAR SEAT, BED AND HIGHCHAIR

Garrett J. Thomas, Zion, Ill.

Application June 21, 1954, Serial No. 438,085

4 Claims. (Cl. 280—41)

My invention relates to baby walkers or strollers.

My invention relates more particularly to a stroller which is capable of use as a car seat for babies, a bed which may be placed upon the back seat of a car, or a highchair for use in the home.

The principal object of the present invention is to provide a combination stroller, car seat, sleeper and highchair so constructed that by easy and simple manipulation it may be transformed from one of the above to any one of the others.

A further object of the invention is to provide a combination stroller construction of the type described which is easily manipulated to effect the various changes and yet which is sufficiently strong and sturdy so that it can be used for a long time without becoming broken or out of order.

A further object of the invention is to provide a stroller construction of the type described which has a latch mechanism for holding the necessary parts in locked position either when open for use as a stroller or with the wheel carriage collapsed to use as a car seat.

A further object of the invention is to provide a stroller of the type described which has a latch mechanism associated with the frame members for locking the frame rigidly in position when the devise is used either as a stroller, a car seat for babies, a bed or a highchair.

A further object of the invention is to make a combination stroller of the type described with comparatively few parts and so arranged that the device may be transformed from one condition to another by the sole manipulation of a single lever mechanism.

Other objects and advantages will be more apparent from the following description wherein reference is had to the accompanying drawings, upon which:

Fig. 5 is a side elevational view of the stroller with the wheeled carriage fastened in a collapsed condition so that the mechanism can be used as a car seat to be fastened on the back of the seat of an automobile;

Fig. 6 is a plan view generally of the wheeled carriage, frame and handle assembly in a collapsed condition, and is taken generally on the line 6—6 of Fig. 5;

Fig. 7 is a fragmentary back view showing the mechanism for raising or lowering the seat for use as a highchair;

Fig. 8 is a fragmentary plan view showing the seat of the stroller fastened into position to be used as a bed; and Fig. 9 is a fragmentary cross-sectional view thereof taken generally on the line 9—9 of Fig. 8.

Figure 1:
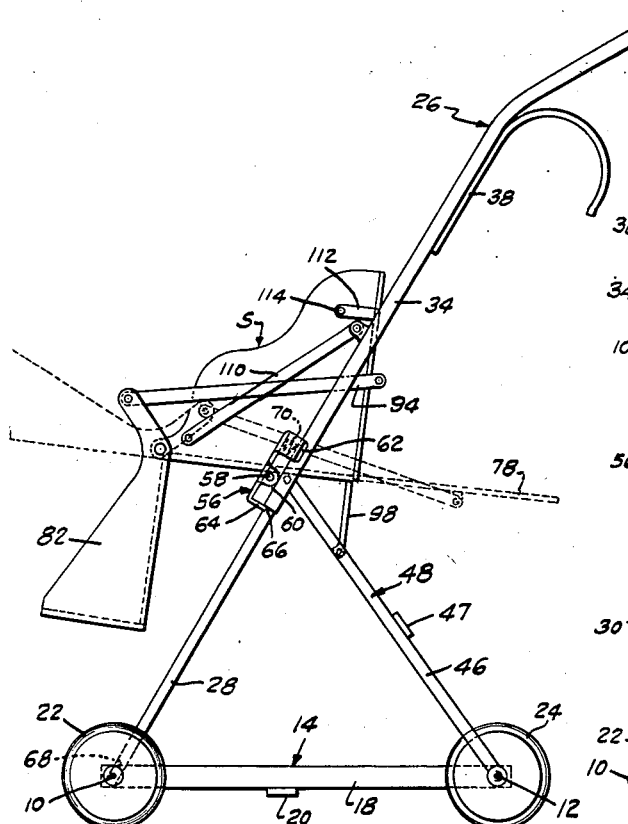
Fig. 1 is a side elevational view of my improved baby stroller.
Figure 2:
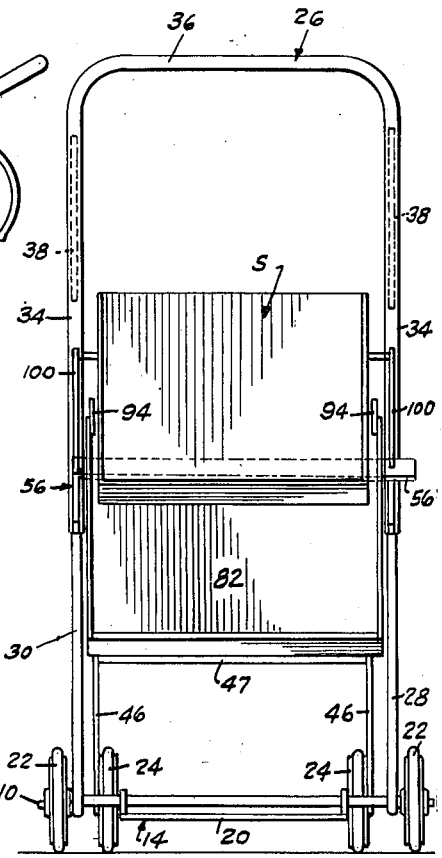
Fig. 2 is a front view thereof.
Figure 3:
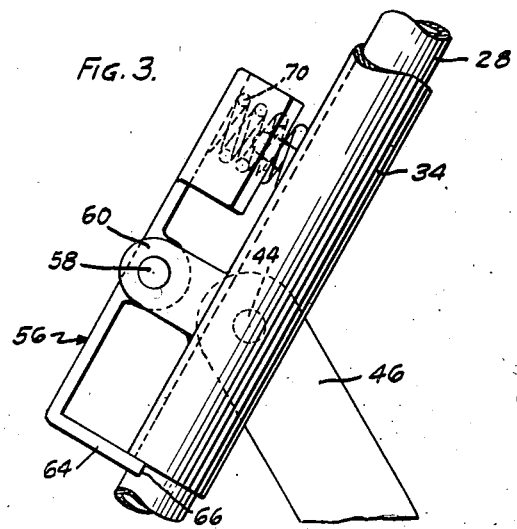
Fig. 3 is a full size fragmentary view of the latch mechanism which I employ.
Figure 4:
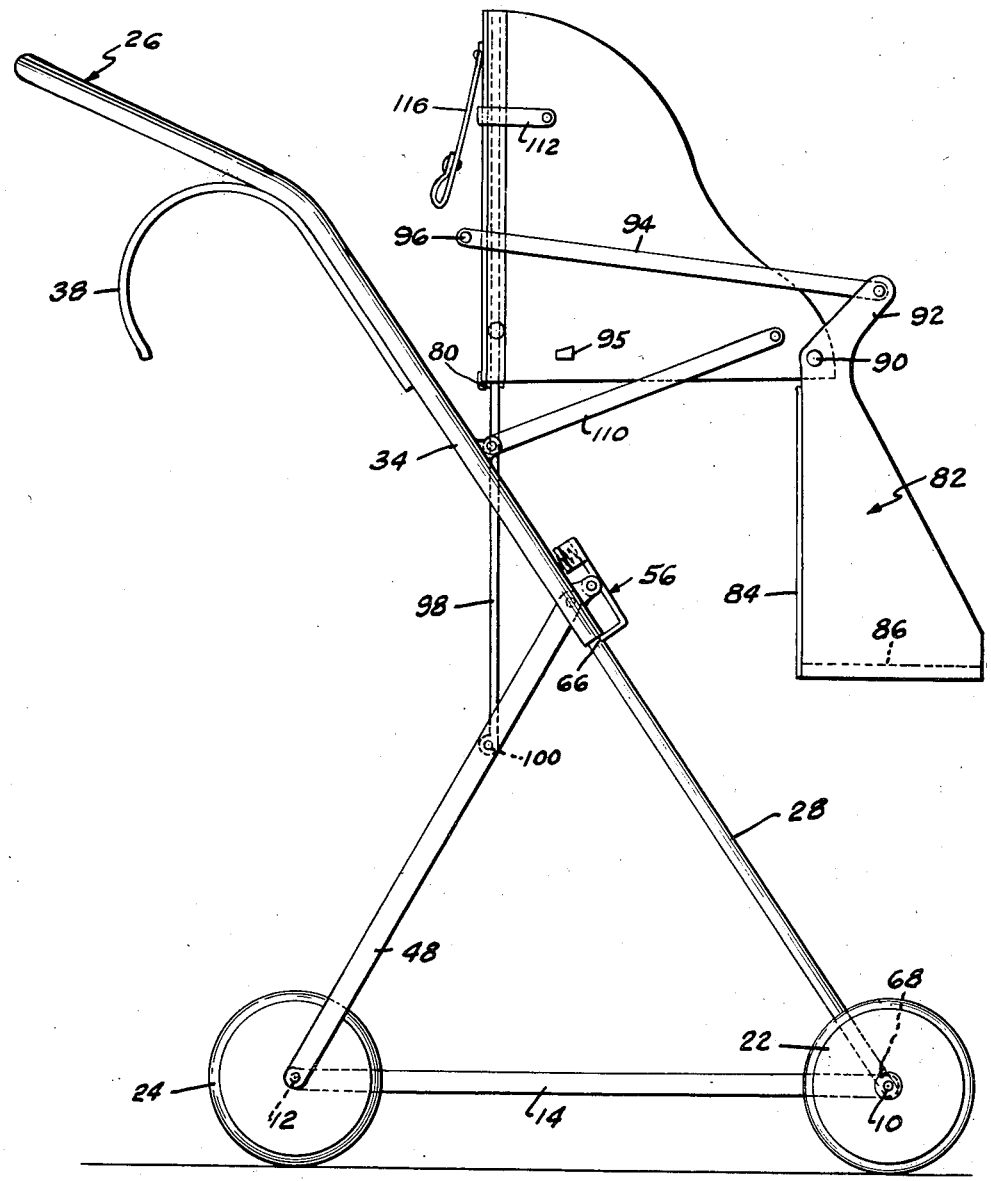
Fig. 4 is a side elevational view of my improved stroller shown with the seat portion raised to be used as a highchair.

In the embodiment of the invention which I have chosen to illustrate and describe the same, I provide a stroller assembly which may include a wheeled carriage having a front axle 10 and a rear axle 12 mounted on an H-shaped frame 14 which consists of the side frame members 16 and 18 and a middle brace 20 welded to the bottom edges of the side braces. The front axle 10 carries the support wheels 22 and the rear axle 12 carries the support wheels 24.

A handle frame assembly 26 is adapted to be mounted on the front axle 10, the assembly including a pair of tubular members 28 and 30 which are adapted to be telescopically received in the two legs 34 of the upper portion of the handle, the leg portions 34 being suitably connected by a bridge portion 36. A pair of hook members 38 are adapted to be welded or otherwise secured to the underside of each of the leg portions 34 for use in hanging the collapsed assembly on the back 40 of an automobile seat 42, as best shown in Fig. 5.

Each of the leg portions 34 of the handle frame has a pivot 44 connected to the inside of the same to pivotally connect one end of the side frame portions 46 of an H-shaped frame member 48 which is pivotally connected at its other end to the back axle 12. A cross-brace 47 disposed medially thereof connects the side frame members 46 together. Suitable spacers 50 on the back axle 12, and 52 and 54 on the front axle 10, separate the longitudinal frame members of each of the support frames 14 and 48.

As previously stated, the rod members 28 and 30 are adapted to be telescopically received in the leg portions 34 of the handle assembly 26. Means for holding the assembly in either the extended position of Fig. 1 for use as a stroller, or in the collapsed position of Fig. 5 for use as a car seat or bed, may include a latch member 56 which is pivotally mounted on a pin member 58 carried by a bracket 60 adjacent the lower end of each of the legs 34. The latch member 56 may include a handle portion 62 and a transverse ledge 64 adapted to engage in a notch 66 or 68 in the rod portions 28 and 30 of the carriage handle. A pair of coiled springs 70 normally hold the ledges 64 in engagement in the slots 66 or 68. For rigidity and to insure simultaneous action of both of the ledges 64, I provide a cross-brace 72 connecting the handle portions 62 of the two ends of the latch together.

The seat S of the stroller may comprise a member having a bottom wall 74 and vertical side walls 76 with a back 78 connected thereto at its lower end by a pair of hinge members 80. A foot or leg support portion 82 formed with a back 84, a foot platform 86, and parallel side walls 88 may be mounted for pivotal movement upon pin member 90 adjacent the front lower end of each of the side walls 76 of the seat. Each of the side walls 88 has an upwardly extending ear portion 92 connected to a pivoted link 94 connected at its other end to a bracket 96 on the rear wall of the seat back 78. This construction is for the purpose of permitting the foot or leg support portion 82, the seat portion S and the back 78 to be aligned to form a horizontal platform so that a cushion or blanket may be placed upon the same and the device used as a bed for a child, as best shown in Figs. 8 and 9. A pair of stop members 95 on the outside surface of the side walls 76 of the seat limit the movement of the links 94.

The seat assembly generally is supported upon the wheeled carriage by means of a pair of upright posts 98 mounted upon pivots 100 that are fastened to the sides of the H-shaped frame 48 adjacent the pivots 44 on the frame members 46. The posts 98 extend upwardly and are telescopically received in a pair of brackets 102 adjacent the back edge of the side walls 76 of the seat, the post having a pair of notches therein to receive a spring pressed pin 104 in either the position shown in Fig. 5 or Fig. 7, thereby locking the seat against movement on the supports 98 in either of the above positions.

The front ends of the side wall 76 of the seat S are connected by a pair of link members 110 to a pivot on each of the legs 34 of the handle 26. Thus it can be seen that at all times the seat S is rigidly supported, both in the collapsed position for use as a bed or as a car seat, and also in the positions where the wheeled carriage is not collapsed, such as for use as a stroller or a high chair, by the upright posts 98 and the linkage 110.

When the back 78 of the seat is in upright position it is fastened adjacent its upper end by a pair of strap members 112 over fasteners 114 positioned on the two side wall members 76 of the seat. Further, when it is desired to use the mechanism as a car seat, I provide a strap member 116 fastened to the back wall 78 of the seat, the strap member being fastened around the rear axle 12 of the wheeled carriage.

From the above and foregoing description it can be seen by those skilled in the art that I have provided in a simple, ingenious mechanism, a construction whereby by operating the latch member 56 the device can be collapsed to form a car seat or a bed, as shown in Figs. 5 and 9. Further, when it is desired to use the wheeled carriage as a high chair, the seat S can be raised upon its vertical supports 98 and supporting links 110.

Suitable brake members are of course provided for the wheeled carriage to prevent its movement when not desired.

I contemplate that changes and modifications may be made in the exact details shown and I do not wish to be limited in any particular; rather what I desire to secure and protect by Letters Patent of the United States is:

1. A collapsible baby stroller of the type having a front axle, a pair of wheels on the ends of said axle, a generally U-shaped handle extending upwardly from said axle, said handle formed of a pair of rods pivotally connected to said axle and a U-shaped upper portion having the legs thereof telescopically receiving said rods, a pivot adjacent the lower end of each of the legs of said upper portion of said handle, a latch member fastened on each leg, each of said latch members having a ledge adapted to engage in one or more slots on said rod portions, a frame pivotally connected to said axle and extending to the rear of said stroller, a second axle carried by said frame, a pair of back wheels mounted on said second axle, a second frame pivotally connected to said second axle at one end and to said pivots at the other end, a pair of upright posts pivotally connected to said second frame, a seat having side walls, brackets fastened to said side walls, said posts telescopically received by said brackets to support said seat on said second frame, said posts being both pivotally and extensibly connected between said second frame and said seat to permit collapsing, hanging the stroller on the back of a car seat or raising the seat to form a highchair, and a pair of link members pivotally connected to said upper handle portions and to the forward end of said seat.

2. A collapsible baby stroller of the type having a front axle, a pair of wheels on the ends of said axle, a generally U-shaped handle extending upwardly from said axle, said handle formed of a pair of rods pivotally connected to said axle and a U-shaped upper portion having the legs thereof telescopically receiving said rods, a pivot adjacent the lower end of each of the legs of said upper portion of said handle, a latch member fastened on each leg, each of said latch members having a ledge adapted to engage in one or more slots on said rod portions, a frame pivotally connected to said axle and extending to the rear of said stroller, a second axle carried by said frame, a pair of back wheels mounted on said second axle, a second frame pivotally connected to said second axle at one end and to said pivots at the other end, a pair of upright posts pivotally connected to said second frame, a seat having side walls, brackets fastened to said side walls, said posts telescopically received by said brackets to support said seat on said second frame, said posts being both pivotally and extensibly connected between said second frame and said seat to permit collapsing, hanging the stroller on back of a car seat or raising the seat to form a highchair, and a pair of link members pivotally connected to said upper handle portions and to the forward end of said seat, said handle having hook portions thereon for hanging the stroller on the back of a car seat in a partially collapsed condition.

3. A collapsible baby stroller of the type having a front axle, a pair of wheels on the ends of said axle, a generally U-shaped handle extending upwardly from said axle, said handle formed of a pair of rods pivotally connected to said axle and a U-shaped upper portion having the legs thereof telescopically receiving said rods, a pivot adjacent the lower end of each of the legs of said upper portion of said handle, a latch member fastened on each leg, each of said latch members having a ledge adapted to engage in one or more slots on said rod portions, a frame pivotally connected to said axle and extending to the rear of said stroller, a second axle carried by said frame, a pair of back wheels mounted on said second axle, a second frame pivotally connected to said second axle at one end and to said pivots at the other end, a pair of upright posts pivotally connected to said second frame, a seat having side walls and a foot support hingedly connected to the front of said seat portion, brackets fastened to said side walls, said posts telescopically received by said brackets to support said seat on said second frame, said posts being both pivotally and extensibly connected between said second frame and said seat to permit collapsing, hanging the stroller on back of a car seat or raising the seat to form a highchair, and a pair of link members connected to said upper handle portions and to the forward end of said seat, a seat back hingedly connected to the back of said seat and capable of being swung to a horizontal position to combine with the seat to form a bed.

4. A collapsible baby stroller of the type having a front axle, a pair of wheels on the ends of said axle, a generally U-shaped handle extending upwardly from said axle, said handle formed of a pair of rods pivotally connected to said axle and a U-shaped upper portion having the legs thereof telescopically receiving said rods, a pivot adjacent the lower end of each of the legs of said upper portion of said handle, a latch member fastened on each leg, each of said latch members having a ledge adapted to engage in one or more slots on said rod portions, a frame pivotally connected to said axle and extending to the rear of said stroller, a second axle carried by said frame, a pair of back wheels mounted on said second axle, a second frame pivotally connected to said second axle at one end and to said pivots at the other end, a pair of upright posts pivotally connected to said second frame, a seat having side walls and a foot support hingedly connected to the front of said seat portion, brackets fastened to said side walls, said posts telescopically received by said brackets to support said seat on said second frame, said posts being both pivotally and extensibly connected between said second frame and said seat to permit collapsing, hanging the stroller on back of a car seat or raising the seat to form a highchair, and a pair of link members connected to said upper handle portions and to the forward end of the seat, a seat back hingedly connected to the back of said seat and capable of being swung to a horizontal position to combine with the seat to form a bed, and links connected between said seat back and said foot support to raise the same to alignment with said seat and back.

(References on following page)

References Cited in the file of this patent

UNITED STATES PATENTS

| | | |
|---|---|---|
| 796,616 | Thompson | Aug. 8, 1905 |
| 893,007 | Mueller | July 14, 1908 |
| 1,353,595 | Karschitz | Sept. 21, 1920 |
| 2,470,040 | Mackin et al. | May 10, 1949 |
| 2,607,396 | Stambaugh | Aug. 19, 1952 |
| 2,616,718 | Heideman | Nov. 4, 1952 |
| 2,685,325 | Webster | Aug. 3, 1954 |
| 2,694,437 | Glaser | Nov. 16, 1954 |

FOREIGN PATENTS

| | | |
|---|---|---|
| 536,029 | Germany | Oct. 19, 1931 |